No. 701,446. Patented June 3, 1902.
L. W. WOOTEN.
COTTON CHOPPER.
(Application filed Dec. 30, 1901.)
(No Model.)
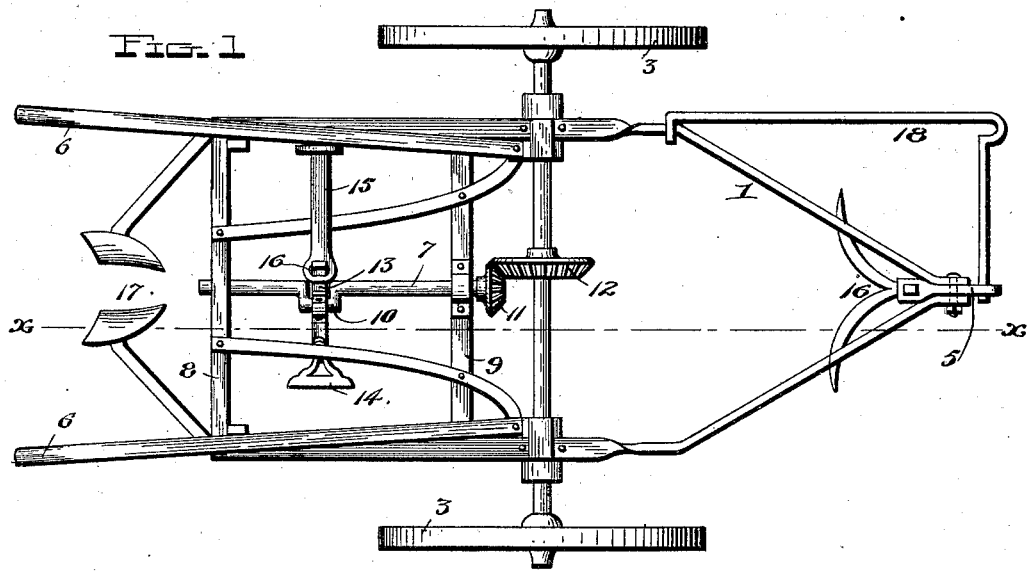
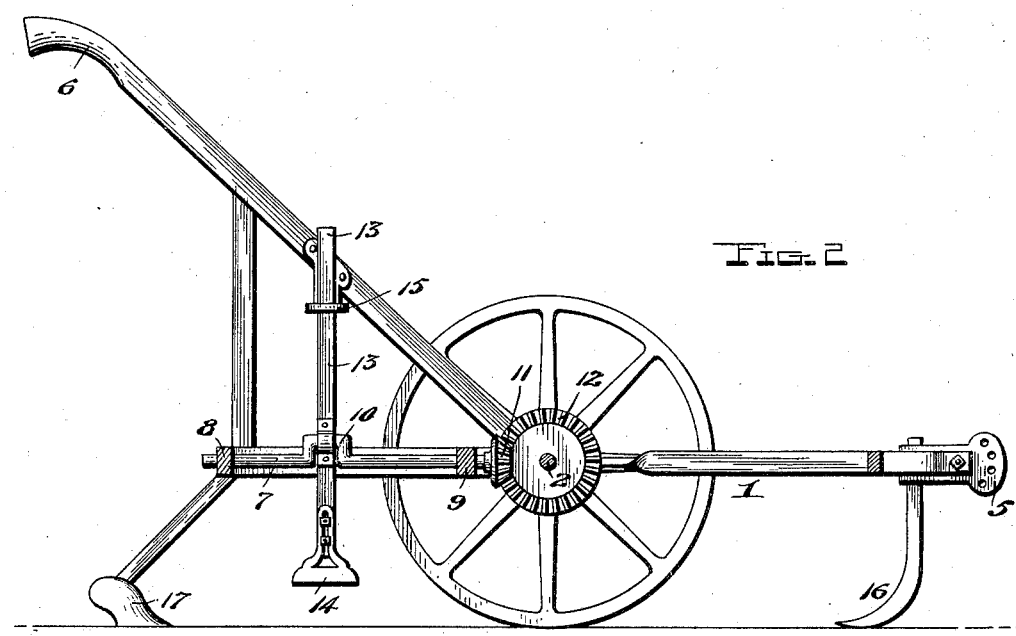
Inventor
L. W. Wooten
Witnesses
By H. B. Willson & Co.
Attorneys

UNITED STATES PATENT OFFICE.

LEWIS W. WOOTEN, OF MOORE, OKLAHOMA TERRITORY.

COTTON-CHOPPER.

SPECIFICATION forming part of Letters Patent No. 701,446, dated June 3, 1902.

Application filed December 30, 1901. Serial No. 87,728. (No model.)

*To all whom it may concern:*

Be it known that I, LEWIS W. WOOTEN, a citizen of the United States, residing at Moore, in the county of Cleveland and Territory of Oklahoma, have invented certain new and useful Improvements in Cotton-Choppers; and I do declare the following to be a full, clear, and exact description of the invention, such as will enable others skilled in the art to which it appertains to make and use the same.

The invention relates to cotton-choppers.

The object of the invention is to provide a machine of this character which shall be simple of construction, durable in use, comparatively inexpensive of production, and efficient in operation.

With this and other objects in view the invention consists of certain novel features of construction, combination, and arrangement of parts, which will be hereinafter more fully described, and particularly pointed out in the appended claim.

In the accompanying drawings, Figure 1 is a top plan view, and Fig. 2 is a longitudinal vertical sectional view on line $x\ x$ of Fig. 1.

Referring to the drawings, 1 denotes the main frame of the machine, 2 the axle, and 3 the supporting-wheels. The forward ends of the side pieces of the main frame converge and are brought together and connected to a clevis 5. 6 denotes handles connected to the main frame and projecting rearwardly thereof, and 7 denotes a shaft journaled in the cross-bars 8 and 9 of the main frame and provided with a crank 10 and with a pinion 11. The latter meshes with a drive-gear 12, fixed to the axle 2. 13 denotes the shank of the chopping-blade 14, said shank being journaled upon the crank 10 and having its upper end guided by a laterally-projecting guide-arm 15, which is secured to one of the handles and is provided with a hole or aperture 16, through which the upper end of the shank 13 projects. As the machine is drawn along, the gear-wheel 12 will transmit its motion to the shaft 7, and thus laterally oscillate or vibrate the chopper-blade.

The forward end of the machine, if desired, may be provided with scrapers 16 and the rear end with cultivator-shovels 17. The frame may also be provided with an auxiliary attaching device 18, one end of which has a hooked engagement with the frame and the other end of which is passed through one of the holes of the clevis 5.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

In a cotton-chopper, the combination with the main frame the forward end of which is provided with a clevis and an auxiliary attaching device having one end attached to the clevis and the other end to the side of the main frame, of an axle journaled in the main frame and provided with a gear-wheel, a crank-shaft journaled in bearings in the main frame at points at the rear of the axle and provided with a gear-pinion meshing with said gear-wheel, a chopper-blade provided with a shank which is journaled upon said crank, and a guide-bracket fixed to the frame of the machine above the crank-shaft and provided with a hole through which the shank of the chopper-blade projects, scrapers 16 secured to the forward end of the machine and shovels 17 secured to the rear end of the machine, substantially as set forth.

In testimony whereof I have hereunto set my hand in presence of two subscribing witnesses.

LEWIS W. WOOTEN.

Witnesses:
 C. O. GOODING,
 LOU M. STRATTAN.